US008517821B2

(12) United States Patent
Shackelford et al.

(10) Patent No.: US 8,517,821 B2
(45) **Date of Patent: *Aug. 27, 2013**

(54) WAGERING GAME HAVING MULTIPLE AWARD COMPONENTS

(75) Inventors: Micheal Shackelford, Henderson, NV (US); Nathaniel Hammond, Las Vegas, NV (US); Dom Tiberio, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,442

(22) Filed: May 23, 2012

(65) Prior Publication Data

US 2012/0231872 A1 Sep. 13, 2012

Related U.S. Application Data

(63) Continuation of application No. 12/102,274, filed on Apr. 14, 2008, now Pat. No. 8,187,077, which is a continuation of application No. 10/957,007, filed on Oct. 1, 2004, now Pat. No. 7,377,850.

(51) Int. Cl.
*A63F 13/00* (2006.01)

(52) U.S. Cl.
USPC .................. 463/20; 463/12; 463/13; 463/16; 463/17; 463/18; 463/19; 463/25

(58) Field of Classification Search
USPC .......................................... 463/12-20, 25-27
See application file for complete search history.

(56) References Cited

U.S. PATENT DOCUMENTS

| | | | | |
|---|---|---|---|---|
| 5,205,555 | A * | 4/1993 | Hamano | 273/143 R |
| 6,004,207 | A | 12/1999 | Wilson, Jr. et al. | |
| 6,033,307 | A | 3/2000 | Vancura | |
| 6,105,296 | A | 8/2000 | Inaba | |
| 6,334,814 | B1 | 1/2002 | Adams | |
| 6,358,146 | B1 | 3/2002 | Adams | |
| 6,569,015 | B1 * | 5/2003 | Baerlocher et al. | 463/16 |
| 6,612,574 | B1 | 9/2003 | Cole et al. | |
| 6,634,945 | B2 | 10/2003 | Glavich et al. | |
| D486,869 | S | 2/2004 | Webb et al. | |
| 6,997,804 | B2 | 2/2006 | Berman | |
| 2003/0060268 | A1 | 3/2003 | Falconer | |
| 2003/0148804 | A1 | 8/2003 | Ikeya et al. | |
| 2004/0051239 | A1 | 3/2004 | Seelig et al. | |
| 2004/0082373 | A1 | 4/2004 | Cole et al. | |
| 2005/0043081 | A1 | 2/2005 | Baerlocher | |
| 2005/0255903 | A1 | 11/2005 | Jackson | |
| 2006/0068892 | A1 | 3/2006 | Gomez et al. | |
| 2006/0189378 | A1 | 8/2006 | Aoki | |

* cited by examiner

*Primary Examiner* — Sunit Pandya
(74) *Attorney, Agent, or Firm* — Brooke Quist; Marvin Hein

(57) ABSTRACT

A multiple bonus modifier game includes a base game and two or more base award modifiers. The multiple bonus modifier game comprises a single spin game that includes a plurality of spinning reels in a base game, a first base award modifier that includes at least one spinning reel, and a second base award modifier that includes at least one additional spinning reel. The outcome of the spinning reels in the base game defines a base game award. The outcome of the spinning reel in the first base award modifier defines a first modifier award, which potentially adjusts the base game award. The outcome of the additional spinning reel in the second base award modifier defines a second modifier award, which potentially adjusts the base game award.

18 Claims, 3 Drawing Sheets

WAGERING GAME HAVING MULTIPLE AWARD COMPONENTS

RELATED APPLICATIONS

This application is a continuation of U.S. patent application Ser. No. 12/102,274, filed Apr. 14, 2008, which is a continuation of U.S. patent application Ser. No. 10/957,007 filed Oct. 1, 2004, now U.S. Pat. No. 7,377,850, issued May 27, 2008, both of which are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates generally to a reel spinning game, and more particularly, to a reel spinning game having multiple payout components acting independently or in conjunction with an award in the reel spinning game.

BACKGROUND

A standard slot machine includes between three and five rotatable reels for use in game play. On the periphery of each reel are gaming symbols, such as assorted fruit, numbers, and/or bar symbols. The reels are caused to spin until each reel reaches a resting position. The success or failure of the game is then determined by comparing the combination of reel symbols that are displayed when the reels are in their resting positions.

To add interest to the game, many different types of slot machines have developed over time. For example, in some slot machines the display windows show more than one adjacent symbol on each reel, thereby allowing betting involving multiple rows. Other types of slot machines have also been developed to increase player interest, including “second chance” games. Typically, “second chance” games try to maintain player interest from a first game segment to a second game segment by providing the player with another opportunity to win.

Additionally, a variety of bonus games have been produced in which a slot machine pays out a final award by adding a single value to, or multiplying a basic slot machine pay award. One such game is a 4-reel slot machine. In such a game, the first three reels embody a basic slot machine game with base pays published on a pay table. For example, 3 bars might pay 10 credits. The 4th reel contains bonus actions that are applied to any base pay if a valid base pay and a bonus action appears on the pay line at the same time. Thus, in one example, the base pay might be multiplied by 10, have 100 added to its value, or respin a random number of times, thereby accumulating some random multiple of the base pay.

Others have produced bonus devices such as secondary wheel games or top box games to provide a bonus game that produces a payment or adds to a base pay on the basic slot machine. These add-on games are more complicated for players to understand and more expensive to produce.

However, there is a continuing need for additional slot machine variants that provide a player with enhanced excitement and diversity of game play, without departing so far from the original slot gaming concept that player comfort is lost. Further, there is a continuing need for a gaming machine that provides increased player excitement due to the visual entertainment that occurs specifically in response to the player’s actions. Additionally, there is a continuing need for a gaming machine that maintains a high rate of game play speed so that the number of games played is not substantially reduced by the variation from the original slot gaming concept. Accordingly, those skilled in the art have long recognized the need for a gaming machine that addresses these issues.

SUMMARY

Briefly, and in general terms, one disclosed embodiment provides a gaming device including a single spin game having indicia of a plurality of reels, wherein a set of outcomes are determinable from the indicia of a plurality of reels that generate base game awards. The gaming device also includes a first bonus reel indicia capable of indicating a first award modifier component and a second bonus reel indicia capable of indicating a second award modifier component. At least one of the predetermined game awards is modified by at least one of the first award modifier component and the second award modifier component to determine a total award. The total award is zero when the base game award is zero, regardless of the activated award modifier components.

In accordance with another embodiment, a gaming device includes: a single spin game having a plurality of indicia-bearing reels operable to spin and stop to display a set of outcomes corresponding to initial game awards. The gaming device also includes at least two modifier indicators, each modifier indicator comprising one indicia-bearing reel capable of indicating a modifier. Each modifier is a multiplier that multiplies an initial game award to determine a total award. The initial game award is adjusted by at least one indicated modifier to determine a total award. The total award is zero when the initial game award is zero, regardless of the activated award modifier components.

In accordance with another embodiment, a gaming device includes a single spin game including a plurality of indicia-bearing reels operable to spin and stop to display one of a set of initial game outcomes that corresponds to a game award. The game further includes at least two award modifier component indicators each comprising an indicia-bearing reel. Each award modifier component indicator is capable of indicating an award modifier component. A total award is determined by modifying the game award by at least one indicated award modifier component. A total award is zero when the game award is zero, regardless of the activated award modifier components Other features and advantages of the disclosed embodiments will become apparent from the following detailed description, taken in conjunction with the accompanying drawings, which illustrate by way of example, the features of the disclosed embodiments.

DETAILED DESCRIPTION OF THE PREFERRED EMBODIMENTS

Figure 1:
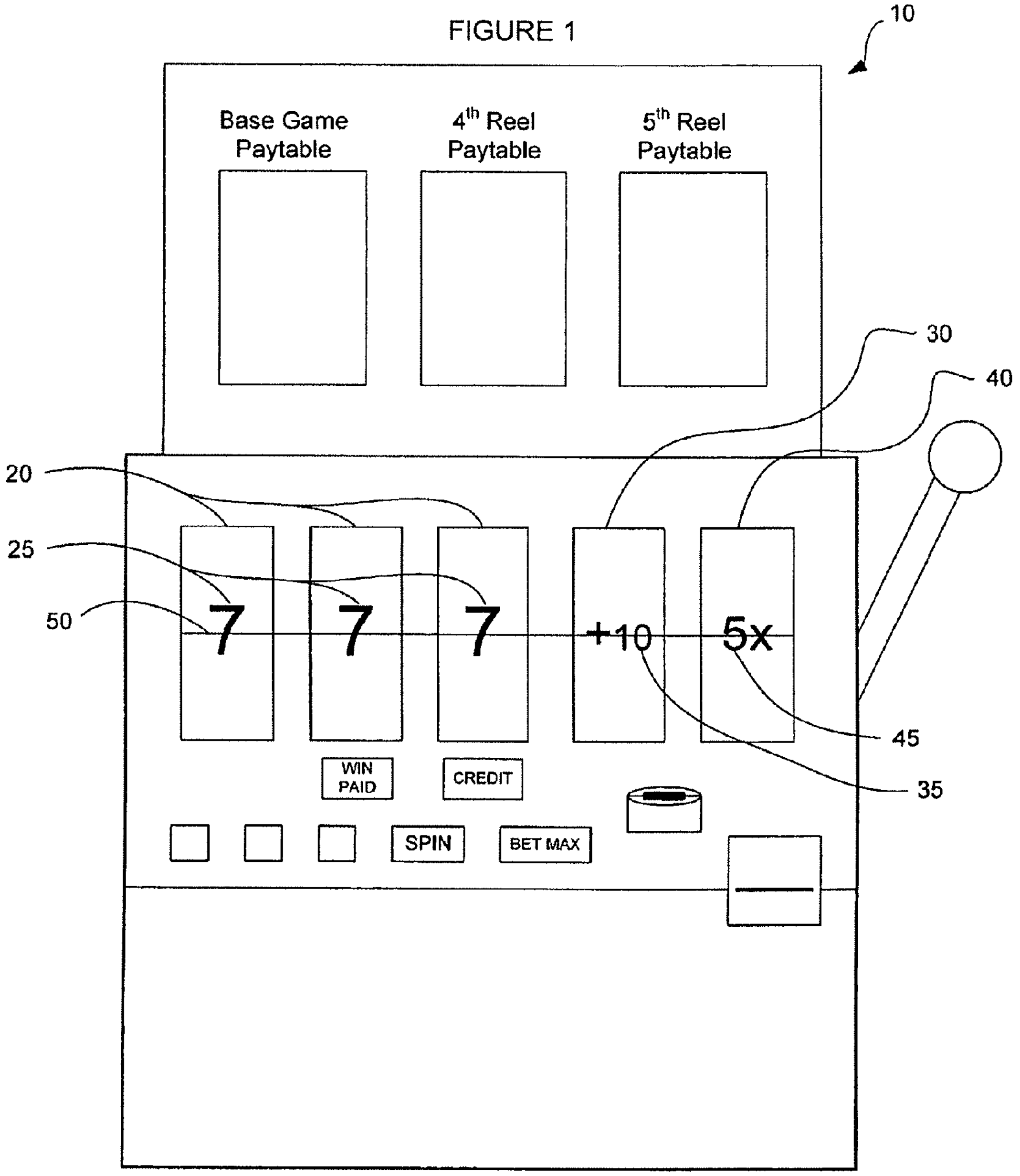
FIG. 1 illustrates a front view of an example embodiment of a multiple bonus modifier game having a base game and two or more base award modifiers operating independently or simultaneously of each other.

A preferred embodiment gaming machine, implemented in accordance with the disclosed embodiments, provides a player with the opportunity to play a base game in conjunction with two or more base award modifiers that operate independently or in conjunction with one another to modify a base game award. In this manner, player excitement is derived and heightened from the visual entertainment that occurs when the multiple base award modifiers act to increase the opportunities for a player to win, as well as the magnitude of those winnings. Referring now to the drawings, wherein like reference numerals denote like or corresponding parts throughout the drawings, and more particularly to FIGS. 1-2, there is shown a preferred multiple bonus modifier game 10.

Referring now to FIG. 1, a multiple bonus modifier game 10 preferably includes a base game and two or more base award modifiers operating independently or simultaneously of each other (i.e., the two or more base award modifiers operate independently of each other or in conjunction with each other to modify a base game award). Specifically, the multiple bonus modifier game 10 comprises: a base game 20 that includes a plurality of spinning reels, a first base award modifier 30 that includes at least one spinning reel, and a second base award modifier 40 that includes at least one additional spinning reel. It will be appreciated by those of skill in the art that whenever spinning reels are described herein, any indicia of spinning reels may be used without departing from the scope of the disclosed embodiments. Such indicia of spinning reels include, by way of example only, and not by way of limitation, physical spinning reels, a video display of spinning reels, or other gaming presentations of spinning reels.

Preferably, the plurality of reels in the base game 20 is spun (or appears to be spun in the case of video representation embodiments). The outcome of the spinning reels in the base game 20 defines a base game award 25, if any (i.e., the outcome does not always produce an award). Additionally, the reel in the first base award modifier 30 is also spun. The outcome of the spinning reel in the first base award modifier 30 defines a first modifier award 35, if any (i.e., the outcome does not always produce an award). The first modifier award adjusts the base game award. Further, the at least one additional reel in the second base award modifier 40 is also spun. The outcome of the additional spinning reel in the second base award modifier 40 defines a second modifier award 45, if any (i.e., the outcome does not always produce an award). The second modifier award 45 (1) adjusts the combined base game award 25 and first modifier award 35 if both awards were given, (2) adjusts only the base game award 25 if only the base game award was given, and (3) adjusts only the first modifier award 35 if only the first modifier award was given. Thus, the first modifier award 35 and the second modifier award 45 operate independently or in conjunction with one another to modify a base game award 25.

As briefly described above, in a preferred embodiment of the multiple bonus modifier game 10 the two or more base award modifiers operate independently or simultaneously (in conjunction) with each other and the base award 25. Operating "independently" in this context means that each award will stand independently, regardless of whether or not another award was won. Specifically, if a base game award 25 was won, a first modifier award 35 was won, and a second modifier award 45 was lost, the base game award 25 and the first modifier award 35 would be given. If a base game award 25 was won, a first modifier award 35 was lost, and a second modifier award 45 was won, the base game award 25 and second modifier award 45 would be given. Further, in some preferred embodiments, if a base game award 25 was won, a first modifier award 35 was lost, and a second modifier award 45 was lost, the base game award 25 still would be given. Moreover, in other preferred embodiments, if a base game award 25 was lost, a first modifier award 35 was won, and a second modifier award 45 was won, the first modifier award 35 and the second modifier award 45 would be given.

In comparison, operating "simultaneously" or "in conjunction with" in this context means that each award can be given at the same time as another award is given. Specifically, if a base game award 25 was won, a first modifier award 35 was won, and a second modifier award 45 was won, the base game award 25 and the first modifier award 35 and the second modifier award 45 would all be given together in combination. Accordingly, in a preferred embodiment of the multiple bonus modifier game 10, if two bonus modifier awards (e.g., the first base award modifier 30 and the second base award modifier 40) appear on the payline 50 along with a valid base pay, both actions are applied to the base pay. For example, three bars pay out 10 credits in the base game 20. Next, a "+10 credits" symbol is achieved on the fourth reel (i.e., first base award modifier 30). Finally, a "times 2" multiplier is achieved on the fifth reel (second base award modifier 40). All symbols lie on the payline 50. The resulting pay is (10+10) "times 2" or 40 credits. Thus, the multiple bonus modifier game 10 is faster to play than a standard primary game with a "secondary" bonus. Furthermore, the machine is less expensive to produce. Moreover, the payouts are more exciting than a standard primary game with a "secondary" bonus.

In a preferred embodiment of the multiple bonus modifier game 10, the outcome of the plurality of spinning reels in the base game 20, the outcome of the at least one spinning reel in the first base award modifier 30, and the outcome of the at least one additional spinning reel in the second base award modifier 40, are all displayed along a payline 50. Accordingly, in a preferred embodiment, the first three reels depict the basic slot machine game 20 with the base pay published on a pay table. In one exemplary embodiment of the base game 20, three bars pay out 10 credits. Continuing, in this embodiment, the fourth reel 30 and fifth reel 40 produce bonus actions (i.e., modifier awards 35 and 45) that are applied to a base game award 25. In one such example, the base game award 25 is multiplied by 10, has 100 credits added to its value, or another similar modifier.

Figure 2:
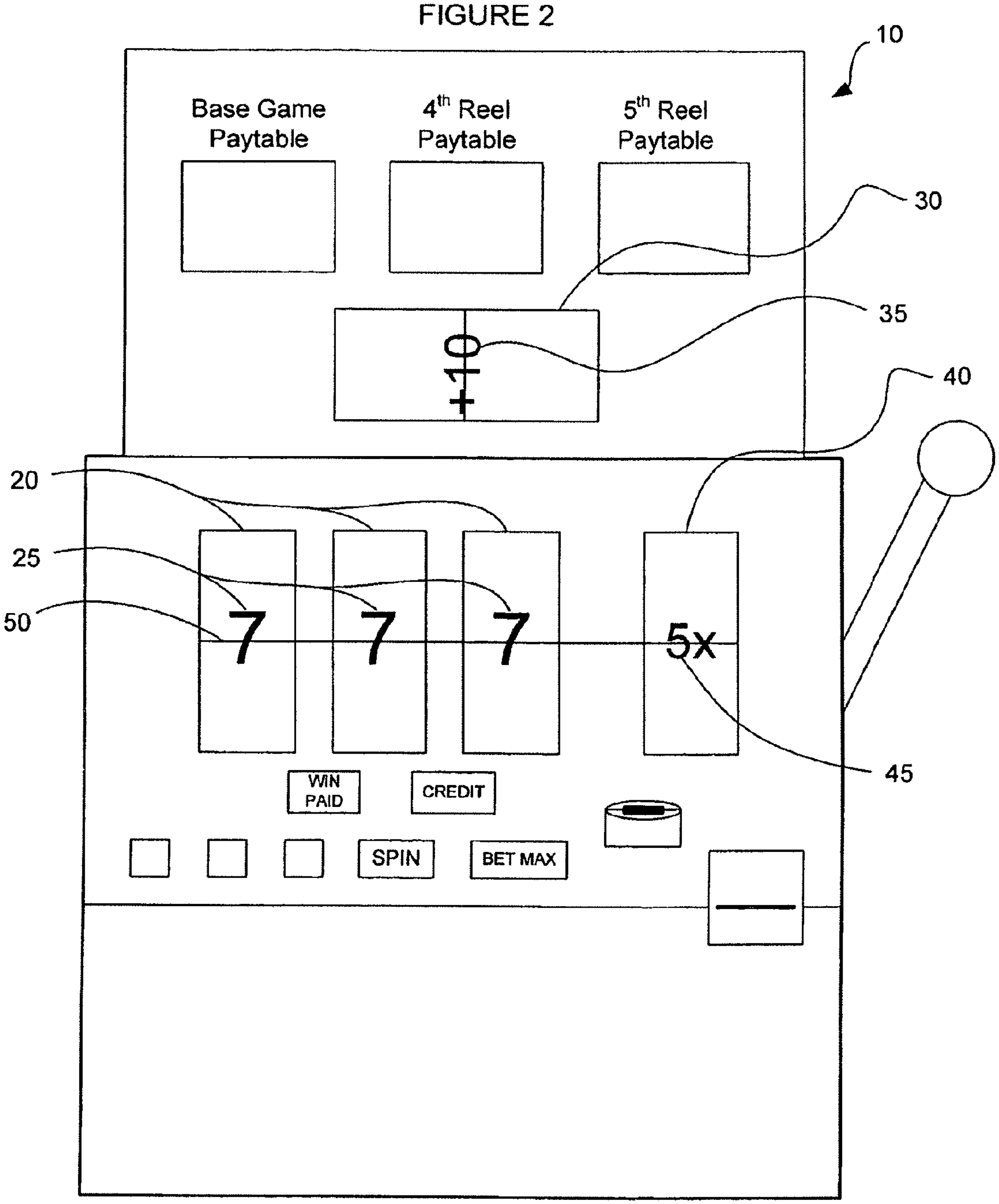
FIG. 2 illustrates a front view of an embodiment of a multiple bonus modifier game having reels in a base game and a reel in a second base award modifier spinning about a substantially horizontal axis, while a reel in a first base award modifier spins about a substantially vertical axis.
Figure 3:
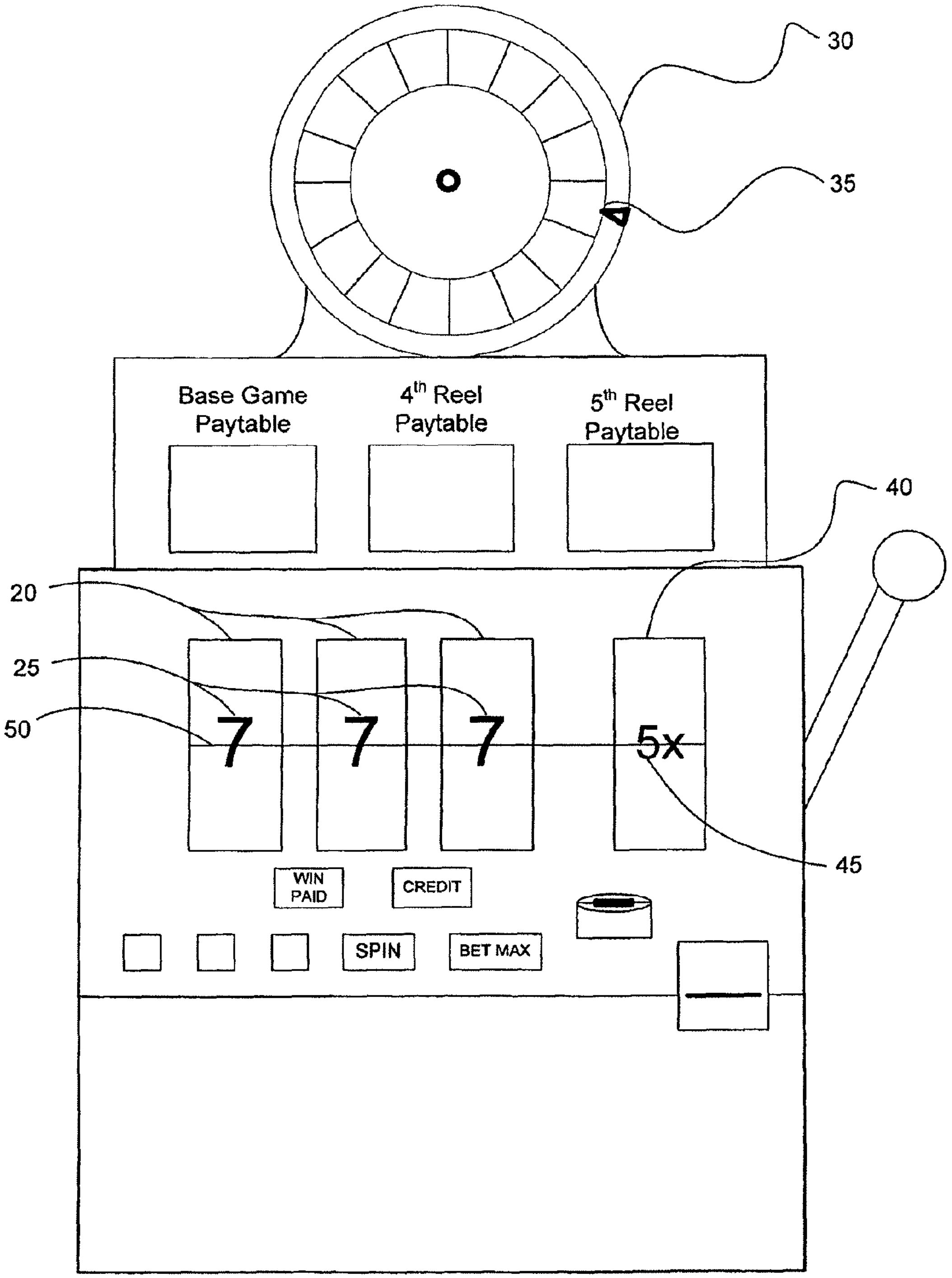
FIG. 3 illustrates a front view of an embodiment of a multiple bonus modifier game having reels in a base game and a reel in a second base award modifier spinning about a substantially horizontal axis, while a reel in a first base award modifier spins about a substantially vertical axis.

Additionally, in one preferred embodiment, the spinning reels in the base game 20 spin about a substantially horizontal axis, while at least one reel of the base award modifiers 30 and/or 40 spins about a substantially vertical axis (as shown in FIG. 2). Further, in another preferred embodiment, the spinning reels in the base game 20 spin about a substantially horizontal axis, while a wheel of the base award modifiers 30 and/or 40 spins in a top box game (as shown in FIG. 3). Accordingly, in a preferred embodiment of the multiple bonus modifier game 10, the first base award modifier 30 and/or the second base award modifier 40 include a trigger on one of the reels that can be modified by the other bonus reel. Thus, in one exemplary preferred embodiment, a "Monte Carlo style" bonus wheel could be triggered by a special symbol on the fourth reel (i.e., the first base award modifier) while an additional multiplier could appear on the fifth reel (i.e., the second base award modifier).

Referring again to FIG. 1, in one preferred embodiment of the multiple bonus modifier game 10, any first modifier award 35 from the first base award modifier 30 is then added to any base game award 25 from the base game 20. Additionally, in one preferred embodiment, a first modifier award 35 from the first base award modifier 30 is awarded only if a (non-zero) base game award was given. However, in another preferred embodiment, a first modifier award 35 from the first base award modifier 30 is awarded regardless of whether a base game award 25 was given. Moreover, in one preferred embodiment, a first modifier award 35 from the first base award modifier 30 rewards a player with additional reel spins. In another preferred embodiment, a second modifier award 45 from the second base award modifier 40 is a multiplier of the base pay award 25, if any (i.e., the base pay award 25 is not zero), and the first modifier award 35, if any (i.e., first modifier award 35 is not zero), in combination.

In a preferred "five coin" embodiment of the multiple bonus modifier game 10, the base game 20 requires three coins to initiate base game play, the first base award modifier 30 requires a forth coin to initiate a first modifier play, and the second base award modifier 40 requires a fifth coin to initiate a second modifier play. Accordingly, the player "buys" these bonuses by paying for an extra coin for each of the bonus reels. Thus, in one preferred embodiment of a "five coin" game, the first three coins purchase any base game award from the base game that may appear on reels 1-3. The fourth coin purchases any bonuses that may appear on reel 4. The fifth coin purchases any bonuses that may appear on reel 5. In one preferred embodiment of the multiple bonus modifier game, reel 4 is an "adder" bonus, and reel 5 is a "multiplier" bonus. Since multipliers are generally more powerful than adders, the player is encouraged to insert the 5th coin.

In another preferred embodiment of the multiple bonus modifier game 10, it includes a base game 20, a first base award modifier 30, and a second base award modifier 40, in which at least one of the base game 20, first base award modifier 30, and second base award modifier 40 does not include spinning reels. In all other respects this embodiment of the multiple bonus modifier game 10 resembles the embodiments discussed above. The gaming format utilized in this (at least partially non-spinning reel) multiple bonus modifier game 10 includes by way of example only, and not be way of limitation, poker, various other card games, and the like. It will be appreciated by those skilled in the art that other known gaming formats may also be utilized.

In another preferred embodiment of the multiple bonus modifier game 10, at least one of the first modifier awards 35 from the first base award modifier 30 rewards a player with a nil adjustment. Correspondingly, at least one of the second modifier awards 45 from the second base award modifier 40 rewards a player with a nil adjustment. In this context, a "nil adjustment" is an "award" that does not alter the original base award 20 (e.g., adding zero to a base award, multiplying a base award times one, and the like).

In still another preferred embodiment of the multiple bonus modifier game 10, at least one of the first modifier awards 35 from the first base award modifier 30 gives a player a negative adjustment. Correspondingly, at least one of the second modifier awards 45 from the second base award modifier 40 gives a player a negative adjustment. In this context, a "negative adjustment" is an "award" that negatively alters the original base award 20 (e.g., subtracting credits from a base award, multiplying a base award times a fraction, and the like).

A preferred embodiment of the multiple bonus modifier game 10 includes multiple bonus reels working independently and/or in conjunction with one another to modify a base game award. One preferred embodiment utilizes a stepper-motor slot system with five spinning reels. However, as stated above, in another preferred embodiment, the multiple bonus modifier game 10 is incorporated into a video slot machine having five or more reels.

Furthermore, the various methodologies described above are provided by way of illustration only and should not be construed to limit the disclosed embodiments. Those skilled in the art will readily recognize various modifications, and changes may be made to the disclosed embodiments without departing from the true spirit and scope of the disclosed embodiments. Accordingly, it is not intended that the invention be limited, except as by the appended claims.

What is claimed:

1. A gaming device comprising:

a single spin game including indicia of a plurality of reels, wherein a set of outcomes are determinable from the indicia of a plurality of reels that generate base game awards;

a first bonus reel indicia capable of indicating a first award modifier component; and a second bonus reel indicia capable of indicating a second award modifier component;

wherein at least one of the predetermined game awards is modified by at least one of the first award modifier component and the second award modifier component to determine a total award, and wherein the total award is zero when the base game award is zero, regardless of the activated award modifier components, wherein any of the additional reel indicia comprise at least one trigger symbol, and wherein the at least one trigger symbol subsequently activates at least a third bonus reel indicia capable of indicating a third award modifier component.

2. The gaming device of claim 1, wherein at least one reel indicia is associated with one or more reels comprising at least one of a physical reel and a video representation of a reel.

3. The gaming device of claim 1, wherein at least one additional reel indicia is associated with at least one payline.

4. The gaming device of claim 1, wherein any of the additional reel indicia comprise a numeric value.

5. The gaming device of claim 1, wherein the third bonus reel indicia is associated with one or more wheels.

6. The gaming device of claim 1, wherein at least one of the first award component and the second award component comprises a multiplier.

7. The gaming device of claim 1, wherein at least one of the first award component or the second award component comprises an adder.

8. The gaming device of claim 1, further comprising a third bonus reel indicia capable of indicating a third award modifier component.

9. The gaming device of claim 1, further comprising a wager, wherein the amount of the wager enables or disables modification of the base game award by at least one award modifier component.

10. A gaming device comprising:

a single spin game including a plurality of indicia-bearing reels operable to spin and stop to display a set of outcomes that correspond to initial game awards; and at least two modifier indicators, each modifier indicator comprising one indicia-bearing reel capable of indicating a modifier, wherein each modifier is a multiplier that multiplies an initial game award to determine a total award;

wherein the initial game award is adjusted by at least one indicated modifier to determine a total award, and wherein the total award is zero when the initial game award is zero, regardless of the activated award modifier components, wherein any of the additional reel indicia comprise at least one trigger symbol, and wherein the at least one trigger symbol subsequently activates at least a third bonus reel indicia capable of indicating a third award modifier component.

11. The gaming device of claim 10, wherein at least one of the modifier indicators comprises at least one of a physical reel and a video representation of a reel.

12. The gaming device of claim 10, wherein each modifier indicator further comprises a payline.

13. The gaming device of claim 10, wherein the modifier indicators include a reel indicia that comprises a numeric value.

14. The gaming device of claim 10, wherein the modifier indicators include a reel indicia that comprises at least one trigger symbol.

15. The gaming device of claim 10, wherein the modifier indicators include a reel indicia that comprises a representation of multiplier.

16. The gaming device of claim 10, wherein the modifier indicators include a reel indicia that comprises a representation of an adder.

17. The gaming device of claim 10, wherein the amount of the wager enables or disables adjustment of the total award by at least one of the modifier indicators.

18. A gaming device comprising:

a single spin game comprising a plurality of indicia-bearing reels operable to spin and stop to display one of a set of initial game outcomes that corresponds to a game award;

at least two award modifier component indicators each comprising an indicia-bearing reel, each award modifier component indicators capable of indicating an award modifier component;

wherein a total award is determined by modifying the game award by at least one indicated award modifier component, and wherein a total award is zero when the game award is zero, regardless of the activated award modifier components, wherein any of the additional reel indicia comprise at least one trigger symbol, and wherein the at least one trigger symbol subsequently activates at least a third bonus reel indicia capable of indicating a third award modifier component.

* * * * *

UNITED STATES PATENT AND TRADEMARK OFFICE

CERTIFICATE OF CORRECTION

PATENT NO. : 8,517,821 B2
APPLICATION NO. : 13/478442
DATED : August 27, 2013
INVENTOR(S) : Michael Shackelford et al.

It is certified that error appears in the above-identified patent and that said Letters Patent is hereby corrected as shown below:

On the Title Page

Item (75) Change Inventor: Nathaniel Hammond to "Nathanial Hammond"

Signed and Sealed this
Twenty-second Day of October, 2013

Teresa Stanek Rea
*Deputy Director of the United States Patent and Trademark Office*